United States Patent Office.

LOUIS STROEVER, OF PHILADELPHIA, PENNSYLVANIA.

Letters Patent No. 67,926, dated August 20, 1867.

IMPROVED MEDICINE.

*The Schedule referred to in these Letters Patent and making part of the same.*

TO ALL WHOM IT MAY CONCERN:

Be it known that I, LOUIS STROEVER, of Philadelphia, in the State of Pennsylvania, have invented a new and useful Medicine for the Cure of Fevers; and I do hereby declare the following is a full and exact description thereof.

To enable others skilled in the art to make and use my invention, I will proceed to describe its composition and the manner of using it.

I take of Jamaica rum one quart; to it add one-half ounce of a Swiss herb called green-mountain tea, powdered fine; add cream of tartar, five ounces; also quinine, four grains, and elixir vitriol, two drachms.

This medicine I use for the cure of fevers generally, especially for fever and ague, bilious fever, and yellow fever. A dose for an adult patient is a small wine-glassful three times a day. This will generally be sufficient for a cure. The medicine will answer its purpose if the green-mountain tea is omitted, though it will be more efficacious if left in as previously mentioned.

What I claim as my invention, and desire to secure by Letters Patent, is this:

I claim a medicine for the cure of fevers, when the said medicine is made of the ingredients herein described, and about in the proportions specified.

LOUIS STROEVER.

Witnesses:
EDWD. BROWN,
PARK M'FARLAND, Jr.